United States Patent
Lam et al.

[11] Patent Number: 6,154,011
[45] Date of Patent: Nov. 28, 2000

[54] CHARGING OF BATTERIES

[75] Inventors: Lan T Lam, Springvale South; Nicholas C Wilson, Hampton; Christopher G Phyland, Ormond, all of Australia

[73] Assignees: Commonwealth Scientifc and Industrial Research Organisation, Campbell, Australia; International Lead Zinc Research Organisation Inc., Research Triangle Park, N.C.

[21] Appl. No.: 09/307,755

[22] Filed: May 10, 1999

Related U.S. Application Data

[63] Continuation-in-part of application No. PCT/AU98/00758, Sep. 15, 1998.

[30] Foreign Application Priority Data

Sep. 15, 1997 [AU] Australia .................................. 9172

[51] Int. Cl.⁷ .................................................. H02J 7/04
[52] U.S. Cl. .................................................... 320/139
[58] Field of Search .................................. 320/139, 141, 320/147, 155, DIG. 17

[56] References Cited

U.S. PATENT DOCUMENTS

| | | | |
|---|---|---|---|
| 3,597,673 | 8/1971 | Burkett et al. | 320/129 |
| 4,061,956 | 12/1977 | Brown et al. | 320/153 |
| 4,246,529 | 1/1981 | Jurgens et al. | 320/139 |
| 4,829,225 | 5/1989 | Podrazhansky et al. | 320/129 |
| 5,179,335 | 1/1993 | Nor | 320/159 |
| 5,202,617 | 4/1993 | Nor | 320/130 |
| 5,307,000 | 4/1994 | Podrazhansky et al. | 320/129 |
| 5,396,163 | 3/1995 | Nor et al. | 320/159 |
| 5,422,559 | 6/1995 | Hall et al. | 320/139 |
| 5,477,125 | 12/1995 | Ettel et al. | 320/156 |
| 5,500,584 | 3/1996 | Shimomoto | 320/159 |
| 5,508,598 | 4/1996 | Al-Abassy | 320/129 |
| 5,539,298 | 7/1996 | Perkins et al. | 320/139 |
| 5,617,005 | 4/1997 | Brown, Jr. et al. | 320/139 |
| 5,617,009 | 4/1997 | Takao et al. | 320/139 |
| 5,684,386 | 11/1997 | Okada | 320/139 |
| 5,696,435 | 12/1997 | Koenck | 320/145 |
| 5,726,554 | 3/1998 | Freiman et al. | 320/139 |
| 5,747,969 | 5/1998 | Tamai | 320/141 |
| 5,808,447 | 9/1998 | Hagino | 320/139 |
| 5,828,202 | 10/1998 | Tamai | 320/141 |
| 5,945,811 | 8/1999 | Hasegawa et al. | 320/141 |

FOREIGN PATENT DOCUMENTS

| | | |
|---|---|---|
| 174 445 | 3/1986 | European Pat. Off. . |
| 41 36 122 A1 | 5/1993 | Germany . |
| 7-298511 | 11/1995 | Japan . |
| 84/00614 | 2/1984 | WIPO . |

OTHER PUBLICATIONS

David Linden, Handbook of batteries, 2nd edition, p. 34.11, Jan. 1995.

*Primary Examiner*—Peter S. Wong
*Assistant Examiner*—Pia Tibbits
*Attorney, Agent, or Firm*—Pillsbury Madison & Sutro LLP

[57] ABSTRACT

A method and apparatus for fast charging of batteries such as lead acid batteries is provided. A repeatedly pulsed current is applied to the battery to enable a determined resistance free maximum pulsed voltage to be reached where the determined resistance free maximum pulsed voltage is below that at which unacceptable gassing will occur. The determined resistance free maximum pulsed voltage is above that of a known average resistance free pulsed voltage for the battery type. When the determined maximum pulsed voltage is reached the pulsed current is continued to be applied to maintain the resistance free maximum pulsed voltage at approximately the determined resistance free maximum pulsed voltage by at least one of: (I) reducing the amplitude of the pulsed charging current, (II) increasing the OFF-time of pulses of the pulsed charging current, (III) decreasing the ON-time of pulses of the pulsed charging current, (IV) a combination of any two or more of (I), (II) or (III). In addition, the present invention may employ a combination of stages to charge the battery. Alternatively or in combination, the system may use a repeatedly pulsed charging current or a repeatedly pulsed charge voltage to control and adjust the charging of the battery.

34 Claims, 13 Drawing Sheets

CHARGING OF BATTERIES

This application is a Continuation-in-Part of International Number PCT/AU98/00758 filed Sep. 15, 1998, which, in turn, claims priority of Australian Application Number P09172 filed Sep. 15, 1997.

FIELD OF THE INVENTION

The present invention relates to the charging of batteries, and relates particularly but not exclusively, to the fast pulse charging of lead acid batteries.

DESCRIPTION OF PRIOR ART

Due to increasing urban pollution and limited fossil fuels, there is a need for road vehicles to meet strict emission requirements.

Using present technology, zero-emission vehicles (ZEVs) are usually electrical vehicles (EVs) powered by batteries. In order to provide a competitive alternative, the EVs require high power high energy, and short charging "refuel" time for quick acceleration, and long distance travel, in a manner similar to standard internal combustion-engine vehicles. For practical purposes, the refuel charging times of the EVs have to be reduced from the present standard of many hours to the order of minutes whilst providing or even extending the service life of the batteries.

Known methods of charging batteries include the use of pulsed currents using a combination of charge and discharge pulses. These methods have the disadvantage of requiring a high pulsed charging current amplitude and/or long pulsed charging time to charge the battery fully in the same time as it would take to charge the battery without the use of discharge pulses. Furthermore, high pulsed current amplitude and long pulsed charging time lead to substantial heat and gas generation. This may result in the drying out of the battery electrolyte with severe grid corrosion of the positive electrodes, and even explosion if the resultant gas which is generated builds up pressure.

Attempts have been made to provide for fast charging of batteries such as lead acid batteries as exemplified by the following prior art patents.

In prior U.S. Pat. Nos. 5,307,000, 4,829,225, 3,597,673, WO84/00614, there are disclosed method for fast charging batteries, but these do not measure the battery internal resistance, and so do not control with resistance free voltage. Other U.S. Pat. Nos. 5,500,584, 5,508,598 and JP 07-298511 measure the voltage when no current is flowing, giving them a resistance free voltage, but they do not measure internal resistance, so they cannot determine the resistance free voltage during the current flow. In U.S. Pat. No. DE 4,136, 122, internal resistance is measured, but it is not used to calculate resistance free voltage. In U.S. Pat. No. 5,680,031, resistance free voltage is used, but the charging is only controlled by the average resistance free voltage, and only the pulse height is changed during charging.

In U.S. Pat. Nos. 5,179,335, 5,202,617, 5,396,163, 5,477, 125 fast charging is achieved using resistance free voltage control, but this is continuous current charging, with current breaks solely to measure the resistance free voltage.

OBJECT AND STATEMENT OF THE INVENTION

The present invention attempts to provide an improved method and apparatus for fast charging batteries. Certain aspects of the invention result in improved battery life over known charging methods.

In accordance with the present invention there is provided a method for charging a battery comprising:
  determining a resistance free maximum pulsed voltage above that of a known average resistance free pulsed voltage for the battery type, said determined resistance free maximum pulsed voltage being below that at which unacceptable gassing will occur,
  providing a repeatedly pulsed charging current to the battery sufficient to cause the determined resistance free maximum pulsed voltage to be reached over time,
  monitoring the resistance free maximum pulsed voltage to detect when the resistance free maximum pulsed voltage reaches the determined resistance free maximum pulsed voltage,
  continuing charging with the repeatedly pulsed charging current to maintain the resistance free maximum pulsed voltage at approximately the determined resistance free maximum pulsed voltage by at least one of:
    (I) reducing the amplitude of the pulsed charging current,
    (II) increasing the OFF-time of pulses of the pulsed charging current,
    (III) decreasing the ON-time of pulses of the pulsed charging current,
    (IV) a combination of any two or more of I, II or III.

Preferably the method involves determining the known average resistance free pulsed voltage for the battery type,
  monitoring the average resistance free pulsed voltage to detect when the average resistance free pulsed voltage reaches the determined known average resistance free pulsed voltage,
  continuing charging with the repeatedly pulsed charging current to maintain the average resistance free pulsed voltage at approximately the determined known average resistance free pulsed voltage by at least one of:
    (I) reducing the amplitude of the pulsed charging current,
    (II) increasing the OFF-time of pulses of the pulsed charging current,
    (III) decreasing the ON-time of pulses of the pulsed charging current,
    (IV) a combination of any two or more of I, II and III.

In accordance with a further aspect of the invention there is provided apparatus for charging a battery comprising, a repeatedly pulsed current providing means for providing a determined resistance free maximum pulsed voltage to the battery above that of a known average resistance free pulsed voltage for the battery type, said resistance free maximum pulsed voltage being below that at which unacceptable gassing will occur,
  monitoring means for monitoring the resistance free pulsed voltage to detect when the resistance free pulsed voltage reaches the determined resistance free maximum pulsed voltage,
  controlling means connected with the monitoring means for controlling the repeatedly pulsed charging current following the determined maximum pulsed voltage being reached to approximately maintain the resistance free maximum pulsed voltage at the determined resistance free maximum pulsed voltage by at least one of:
    (I) reducing the amplitude of the pulsed charging current,
    (II) increasing the OFF-time of pulses of the pulsed charging current,
    (III) decreasing the ON-time of pulses of the pulsed charging current,
    (IV) a combination of any two or more of I, II or III.

Preferably, said monitoring means is also for monitoring the average resistance free pulsed voltage to detect when the average resistance free pulsed voltage reaches a determined known average resistance free pulsed voltage for the battery type, and wherein said controlling means is also for controlling the repeatedly pulsed charging current following the determined known average resistance free pulsed voltage being reached, to approximately maintain the average resistance free pulsed voltage at the determined known average resistance free pulsed voltage by at least one of:
(I) reducing the amplitude of the pulsed charging current,
(II) increasing the OFF-time of pulses of the pulsed charging current,
(III) decreasing the ON-time of pulses of the pulsed charging current,
(IV) a combination of any two or more of I, II or III.

BRIEF DESCRIPTION OF THE DRAWINGS

In order that the invention can be more clearly ascertained examples of preferred embodiments will now be described with reference to the accompanying drawings wherein.

DESCRIPTION OF EXAMPLES OF THE PREFERRED EMBODIMENTS

Figure 1:
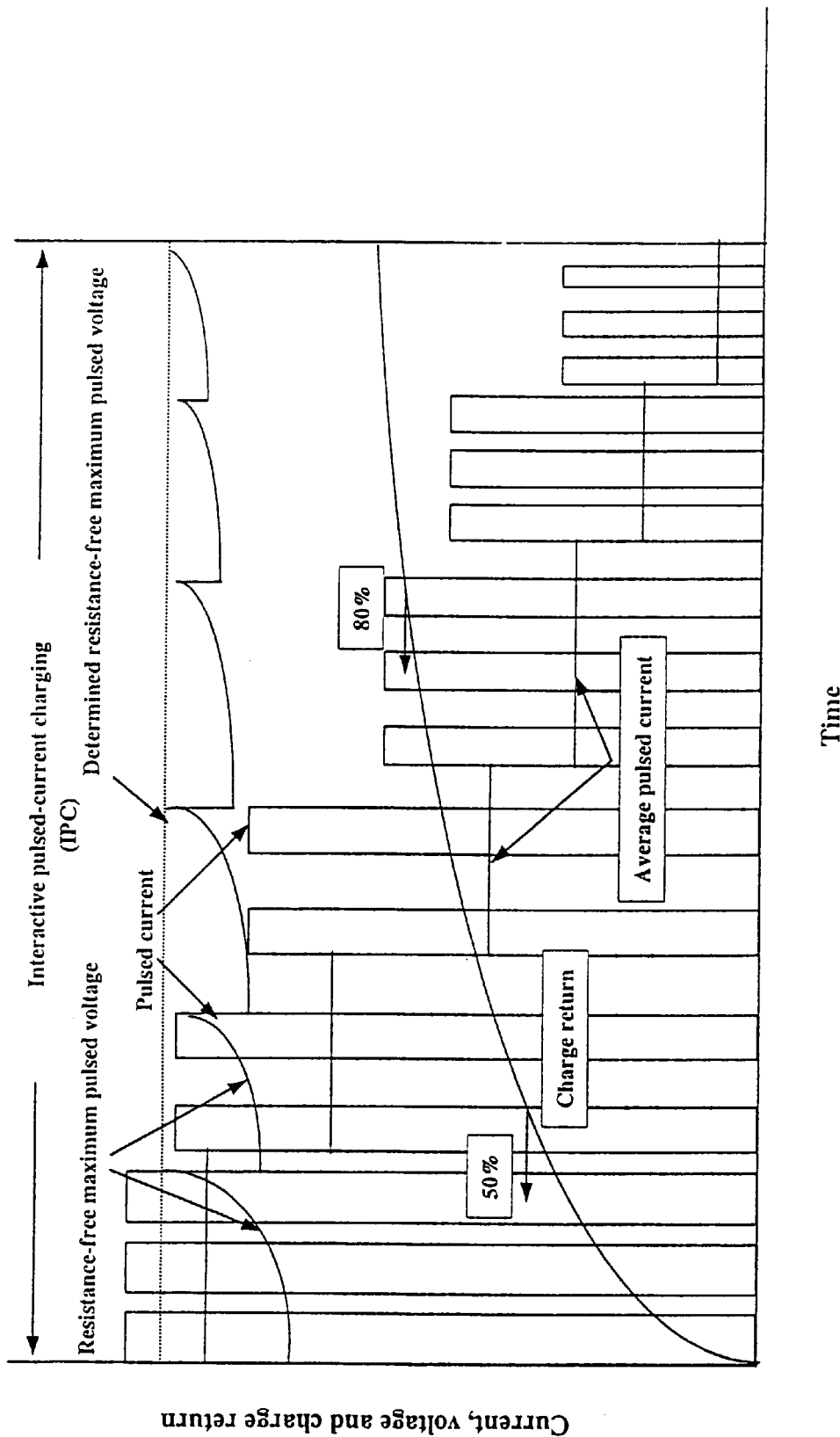
FIG. 1 is a schematic diagram of current and voltage against time showing continuously pulsed current charging of a first example of the present invention.

Referring firstly to the embodiment of FIG. 1 there is shown an example of repeatedly pulsed current charging according to a first embodiment. The method can be referred to as an interactive pulsed current (IPC method). A pulsed current is supplied to the battery which has a short ON-time, a high duty cycle and a high averaged pulsed current. For example, it is preferred that the ON-time is initially 20 ms, the duty cycle is initially 85% and the average pulsed current is initially about $6.5 \times C_3$ Amps ($C_3$ being the 3 hour discharge capacity of the particular battery, such as a lead acid battery). During charging the average pulsed current will fall to about $0.02 \times C_3$ amps.

The amplitude of the pulsed current is controlled interactively to maintain the resistance free maximum pulsed voltage at the terminals of the battery above that of a known average resistance free pulsed voltage for the particular battery type.

The known average resistance free pulsed voltage for the battery type is equal to the top-of-charge voltage for non pulsed direct current charging for a lead acid cell this is typically 2.45 volts per cell.

Figure 2:
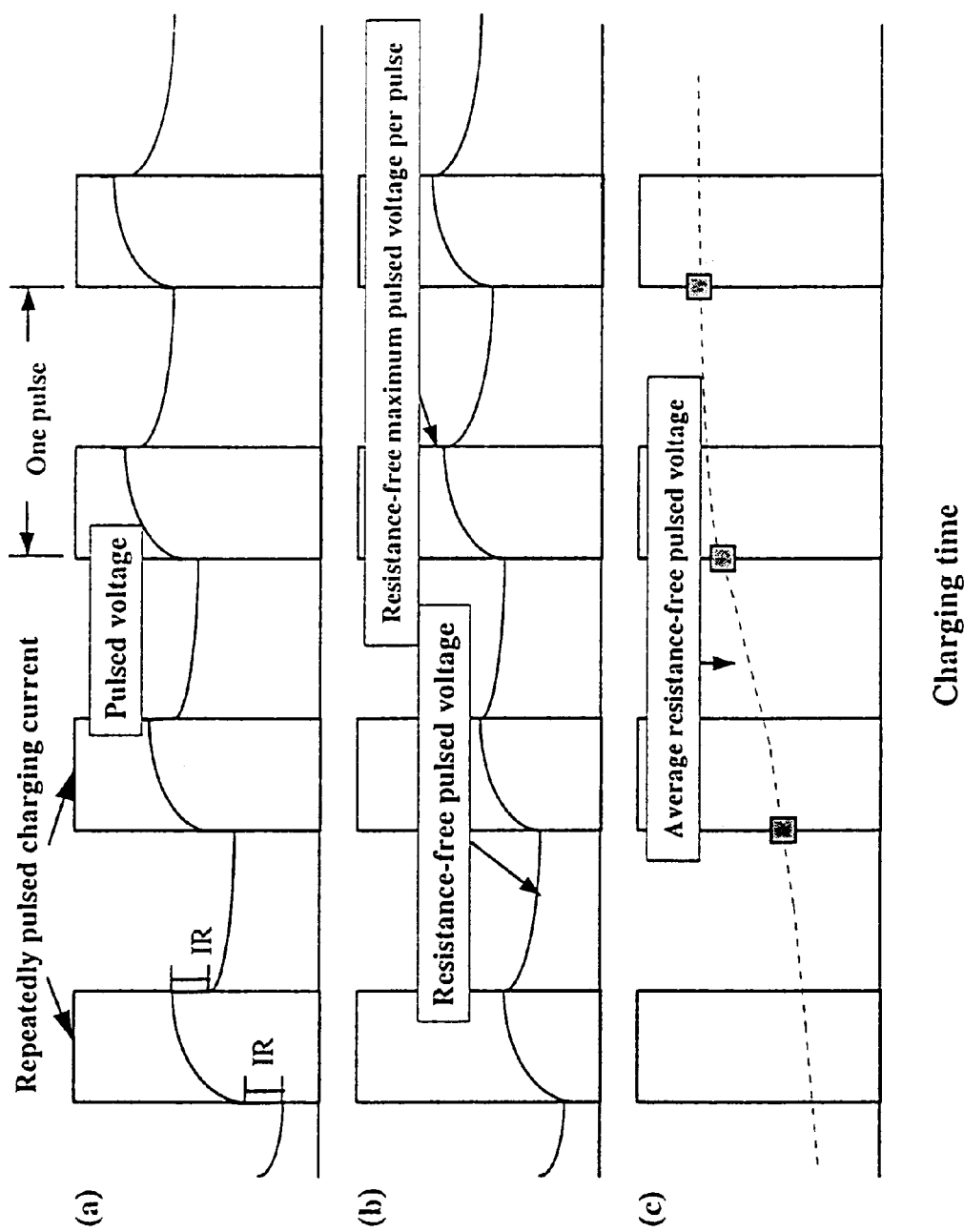
FIG. 2 is a set of schematic diagrams of current and voltage against time showing resistance free maximum pulsed voltage and average resistance free pulsed voltage.

Resistance free pulsed voltage is explained in FIG. 2. Here, FIG. 2a shows the voltage at the terminals of the battery consequent on the repeatedly pulsed charging current. Part of this voltage is the voltage developed by the product of the current flowing and the internal resistance of the cells of the battery—ie the IR voltage component.

FIG. 2b shows the resistance free pulsed voltage which has been obtained by removing the IR voltage component shown in FIG. 2a.

FIGS. 2a and 2b show that with consecutive pulses the battery is progressively charged and therefore the magnitude of the resistance free pulsed voltage increases during charging.

FIG. 2b shows that the highest voltage peak developed with each ON period of a pulse is equal to the magnitude of the resistance free maximum pulsed voltage. One pulse of the charging current is represented by an ON-time period and an OFF-time period until the onset of the next ON-time in the next pulse.

FIG. 2c shows that the resistance free average pulsed voltage—the average voltage of that shown in FIG. 2b—is an increasing voltage with successive charging pulses.

The above explanation of the resistance free pulsed voltages assumes a battery in good condition.

In the charging process according to the first embodiment of the present invention, a target objective is to charge so that the resistance free maximum pulsed voltage is always below that at which unacceptable gassing will occur from the cells in the battery. This particular voltage is determined and then targeted as an upper limit for charging. In other words, during charging according to the first example the resistance free maximum pulsed voltage is monitored. The resistance free maximum pulsed voltage will gradually rise during charging until it reaches the determined upper limit of the resistance free maximum pulsed voltage. When the determined upper limit of the resistance free maximum pulsed voltage is reached over time, the repeatedly pulsed charging current is interactively altered to maintain the resistance free maximum pulsed voltage at approximately the determined upper limit of the resistance free maximum pulsed voltage above which unacceptable gassing will occur. In this way, high charge can be provided to the battery in a short charging time without excessive gassing.

Unacceptable gassing is gassing which is unwanted and which could cause a cell to build up pressure and explode or to heat thereby losing electrolyte. Gassing during charging is a natural consequence of the charging process and unacceptable gassing is to be understood to mean copious gassing which is unwanted which may have deleterious effects to the battery.

Accordingly, the determined resistance free maximum pulsed voltage is above that of a known average resistance free pulsed voltage for the battery type. The resistance free maximum pulsed voltage is above the magnitude of the known average resistance free pulsed voltage but below that at which unacceptable gassing will occur.

FIG. 1 shows the applied current and the resistance free maximum pulsed voltage but does not show the known average resistance free pulsed voltage in order to aid clarity.

When the resistance free maximum pulsed voltage reaches the determined resistance free maximum pulsed voltage, then charging is continued in a controlled manner by adjusting the repeatedly pulsed charging current to maintain a resistance free maximum pulsed voltage at approximately the determined resistance free maximum pulsed voltage by one of several methods.

A first method of controlling involves reducing the amplitude of the pulsed charging current as has been shown in FIG. 1. When the determined resistance free maximum pulsed voltage is reached then the amplitude of the repeatedly pulsed charging current is reduced so the resistance free maximum pulsed voltage is maintained approximately at the determined resistance free maximum pulsed voltage.

The second method of maintaining the resistance free maximum pulsed voltage at approximately the determined resistance free maximum pulsed voltage is to increase the OFF-time of the pulses in the pulsed charging current.

The third method is to decrease the ON-time of the pulses of the pulsed charging current.

A fourth method involves a combination of any two or more of the first three methods.

For a valve regulated lead acid battery, the determined resistance free maximum pulsed voltage is typically about 2.6 volts per cell. The known average resistance free pulsed voltage is typically 2.45 volts per cell.

The present example has recognised that if the resistance free maximum pulsed voltage is maintained at a determined upper voltage below that at which unacceptable gassing will occur, enhanced charging can be realised whilst at the same time battery life can be significantly improved.

Charging according to the technique shown in FIG. 1 can provide rapid charge or rapid replacement of taken charge from a battery such as a lead acid battery in a very short time period. For example, 80% of charge or taken charge can be provided to a battery in about 10 minutes. The battery cycle life does not suffer to the same degree as in known prior art charging techniques.

Charging according to the first example has significant implications for battery powered vehicles because 80% or thereabouts of charge can be returned to a battery in a short time period of about 10 minutes which makes the technique ideal for battery powered vehicles in a metropolitan area. Parking establishments for electric powered vehicles can provide electric cable connection with the vehicle to provide this charge whilst the vehicle is unattended.

Figure 3:
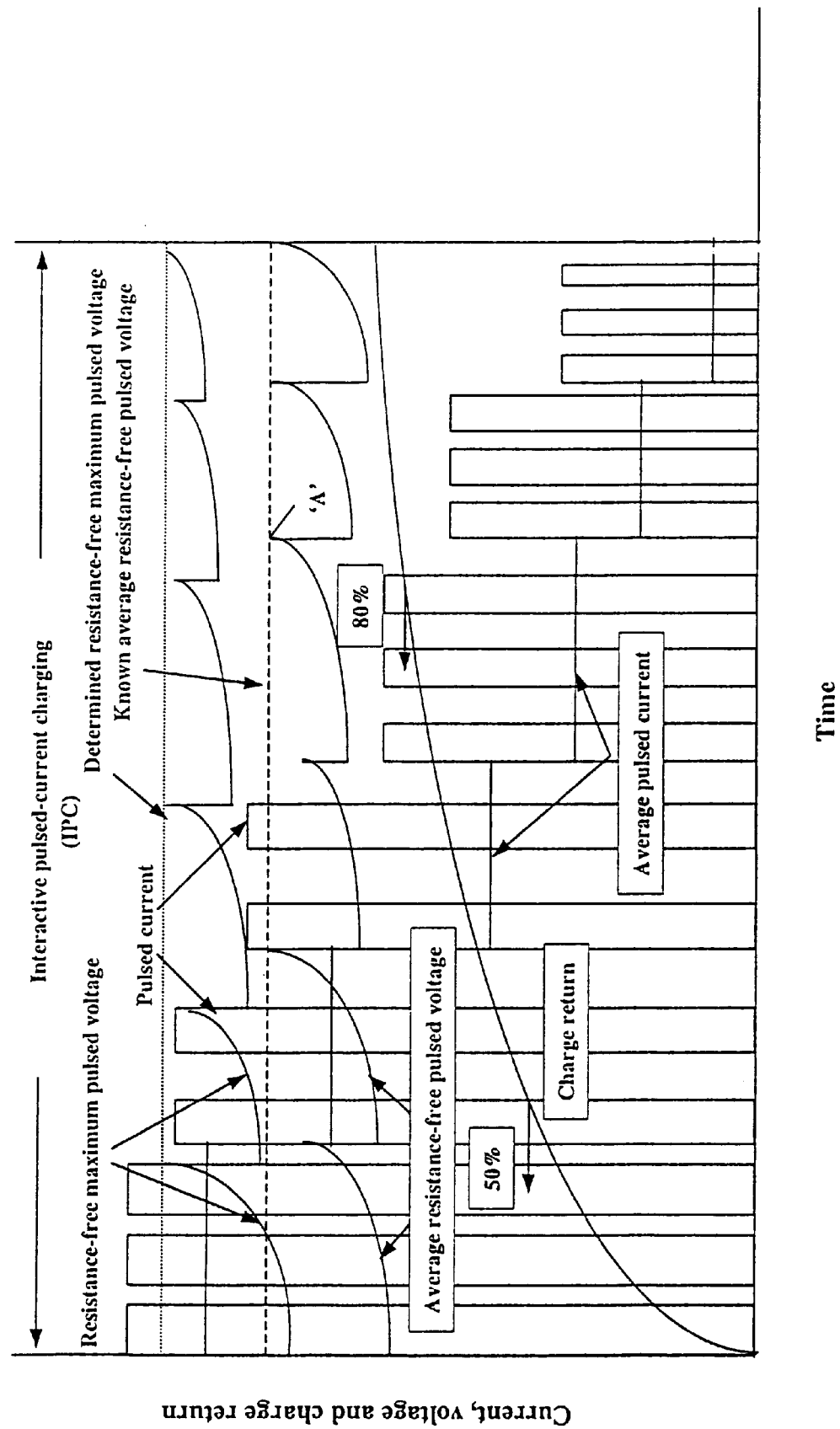
FIG. 3 is a view similar to that of FIG. 1 but of a second example of the present invention.

Referring now to FIG. 3 there is shown a second example of the present invention and this example is also referred to as an interactive pulsed current (IPC) method. In this example it is preferable to use a similar pulsed current as in the first example. Here, in this example, the average resistance free pulsed voltage for a battery type is determined. In the case of a valve regulated lead acid battery this known average resistance free pulsed voltage is 2.45 volts per cell.

This particular voltage is also targeted such that when the average resistance free pulsed voltage reaches the known average resistance free pulsed voltage—as exemplified by character "A" in FIG. 3—then the repeatedly pulsed charging current is changed to maintain the average resistance free pulsed voltage at approximately the known average resistance free pulsed voltage. This is achieved by the same process of altering the charging current pulses as described in the first example.

In other words, in one example the repeatedly pulsed charging current is altered by reducing the amplitude of the pulsed current.

In another example it can be changed by increasing the OFF-time of the pulses of the pulsed charging current.

In another example it can be altered by decreasing the ON-time of the pulses in the charging current.

A fourth way of altering the charging current is to provide a combination of any two or more of the above three processes.

Thus, in this example, both the determined resistance free maximum pulsed voltage is targeted and the known average resistance free pulsed voltage is also targeted. When either of these voltages reaches the determined resistance free maximum pulsed voltage or the known average resistance free pulsed voltage, the charging current is altered so that the respective resistance free maximum pulsed voltage or the average resistance free pulsed voltage does not exceed the determined and known voltages.

The process according to the second embodiment provides for enhanced battery charging and battery life relative to that in the first example.

Figure 4:
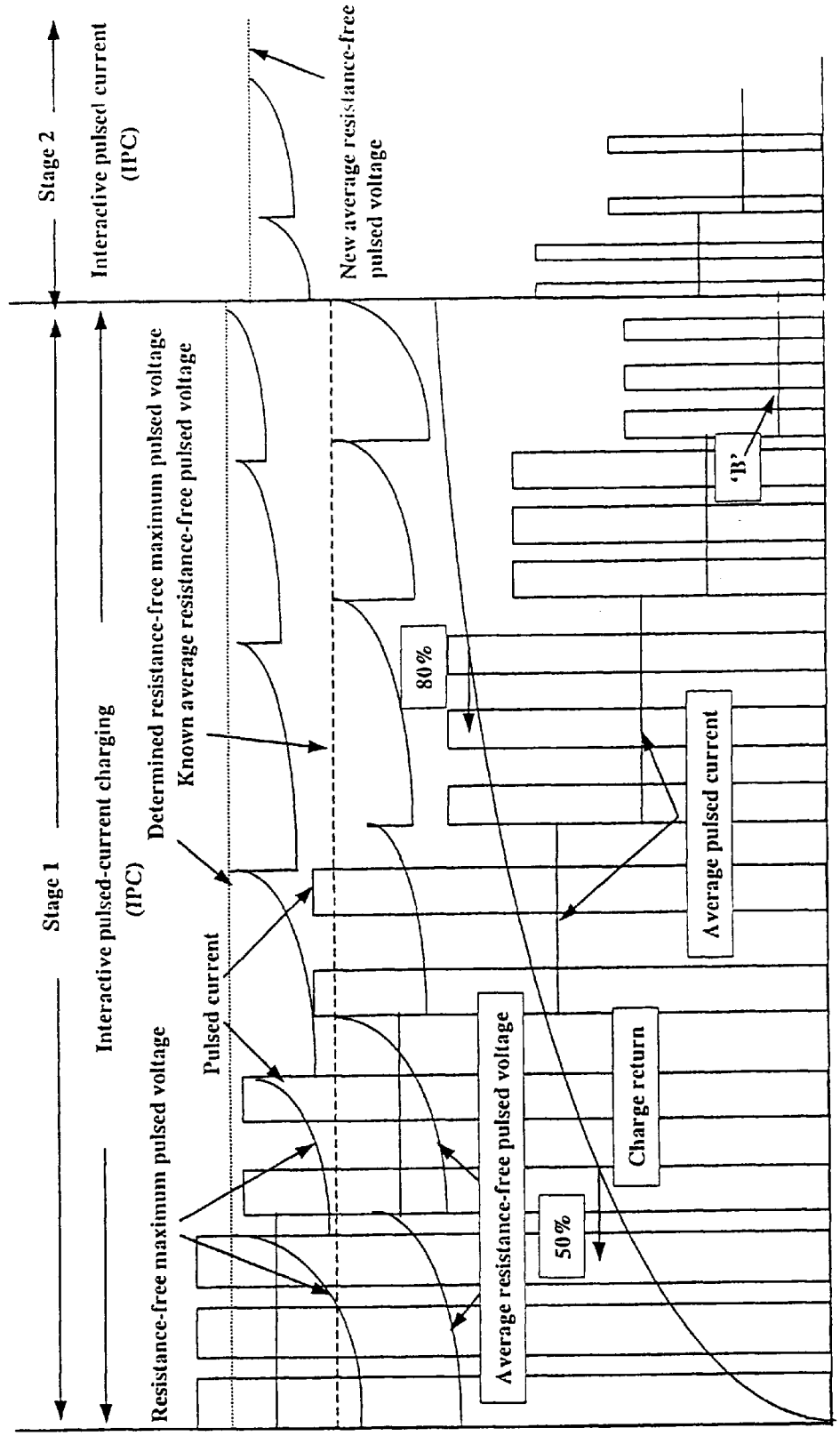
FIG. 4 is a schematic diagram of current and voltage against time showing a third example of the present invention where there is a first stage of charging and a second stage of charging.

Referring now to FIG. 4 there is shown a charging processes which embodies the concepts of the first and second examples as a first stage of charging (ie IPC) but other concepts in a second stage of charging. Here, the first stage of charging is represented by the embodiment of FIG. 1 or FIG. 3 and for convenience the first stage has been shown according to the embodiment of FIG. 3. It should be noted from FIG. 3 that the average pulsed charging current decreases over time during charging. This current is shown particularly where the resistance free maximum pulsed voltage has been maintained at the determined resistance free maximum pulsed voltage and indicated by character "B" in FIG. 4. When the repeatedly pulsed charging current falls to a particular level, the time taken to provide further appreciable charge will become unacceptable. In other words, to provide the balance of charge for full charge, it may take one or more hours once that predetermined current is reached. When this level of average pulsed charging current is reached we then change to a second stage of charging. The value of the average pulsed charging current which initiates the second stage of charging is therefore a predetermined level of average pulsed charging current. The repeatedly pulsed charging current is then applied with a different criteria. Typically, the pulsed charging current has a shorter ON-time than the repeatedly pulsed charging current ON-time in the first stage of charging such as 8 ms. The average pulsed current may then be in the order of $1 \times C_3$ amps. Thus, during the second stage an interactive pulsed current is also applied. Thus, the example shown in FIG. 4 can be referred to as an interactive pulsed current/pulsed current mode (IPC-IPC method). In the second stage we determine a new average resistance free pulsed voltage above that determined in the first stage. This new average resistance free pulsed voltage is such that it will result in controlled gassing of the cells of the battery but will establish charge balance between cells. In other words, the charging is altered so that further appreciable charge can be provided to the battery in a relative short time. Charging in the second stage results in some gassing but it is controlled by the magnitude of the charging current so that it does not result in excessive over heating or gas generation which may cause explosion.

Normally an EV battery pack is comprised of individual cells or battery modules that are connected in series into a single string or into multiple strings which are connected in parallel. The number of cells/battery modules and strings are dependent on the power required by the vehicle. Charging of a single VRLA cell is relatively straight forward compared with charging of a battery module of similar technology. This is due to the fact that individual cells connected in series within a VRLA battery module are prone to differences in charge acceptance due to difficulty in achieving uniform saturation of the electrolyte. Cells with optimum electrolyte saturation will develop an internal oxygen cycle and will accept more charge than cells with excessive electrolyte saturation. This, in turn, may lead to a situation in which some cells in the module are overcharged while others are undercharged. Such a problem will be magnified when a string of cells or battery modules are charged and discharged. By charging during the second stage, each of the cells can be brought to an approximate similar charged condition.

Thus, during the second stage of charging a new average resistance free pulsed voltage is established which is above that in the first stage for a valve regulated lead acid battery this is typically 2.55 volts per cell. The average resistance free pulsed voltage is then targeted so that when it reaches the new average resistance free pulsed voltage the charging current is then altered to maintain the average resistance free pulsed voltage approximately at the determined new average resistance free pulsed voltage. This is achieved by one of four possible methods.

In a first process the amplitude of the pulsed charging current is reduced.

In a second process the OFF-time of the pulses of the pulsed charging current are increased.

In a third process the ON-time of the pulses of the pulsed charging current are decreased.

In a fourth process a combination of any two or more of the first three processes is used.

Figure 5:
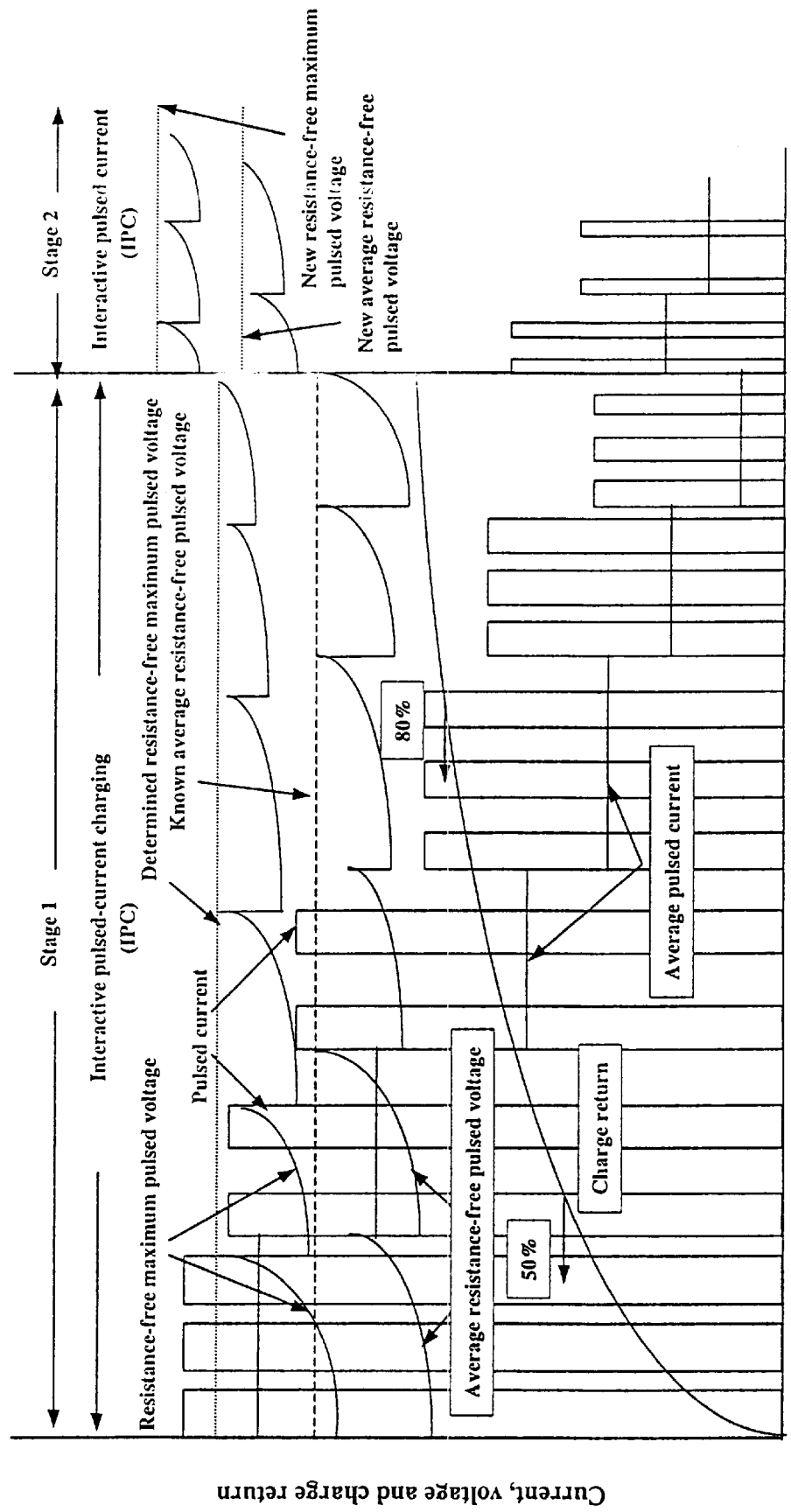
FIG. 5 is a view similar to that of FIG. 4 but of a fourth example of the present invention.

Referring now to FIG. 5 there is shown a fourth example of charging.

In the example shown in FIG. 5 there is a first stage of charging which is the same as in the examples shown in 1 or 3 and for convenience the example shown in FIG. 3 has been shown in FIG. 5 as the first stage. A second stage of charging is then entered and this is initiated when the average pulsed charging current in the first stage falls to the predetermined level where the time taken to provide further appreciable charge is unacceptable as previously explained. This is an interactive pulsed current process. Thus, the example in FIG. 5 is an IPC-IPC method. Charging is then continued by applying a repeatedly pulsed charging current. This charging current is targeted to provide a new resistance free maximum pulsed voltage above that in first stage. Typically, the ON time is about 8 ms and the average pulsed current is about 1×$C_3$ amps. The new resistance free maximum pulsed voltage is such that it results in controlled gassing sufficient to establish balance between cells in the battery. This controlled gassing has been explained in the previous embodiment. The resistance free maximum pulsed voltage is then monitored to detect when the resistance free maximum pulsed voltage reaches the determined new resistance free maximum pulsed voltage. For a valve regulated lead acid cell this is typically 2.7 volts per cell. When this voltage reaches the new determined resistance free maximum pulsed voltage the charging current is adjusted to maintain the resistance free maximum pulsed voltage at approximately the determined new resistance free maximum pulsed voltage.

This is achieved by at least one of the following four methods.

1. The amplitude of the pulsed charging current is reduced.
2. The OFF-time of the pulses of the pulsed charging current are increased.
3. The ON-time of the pulses of the pulsed charging current are decreased.
4. Charging is provided by a combination of any two or more of the above three processes.

A fifth example also shown in FIG. 5 involves a combination of the example shown in FIG. 4 and the example described in FIG. 5 above where both the new average resistance free pulsed voltage and the new resistance free maximum pulsed voltage are targeted in a second stage of charging. The charging current is adjusted when either the average resistance free pulsed voltage or the new resistance free maximum pulsed voltage are reached in accordance with the four processing steps previously referred to. Increased charging is effected whilst maximising the life of the battery.

Figure 6:
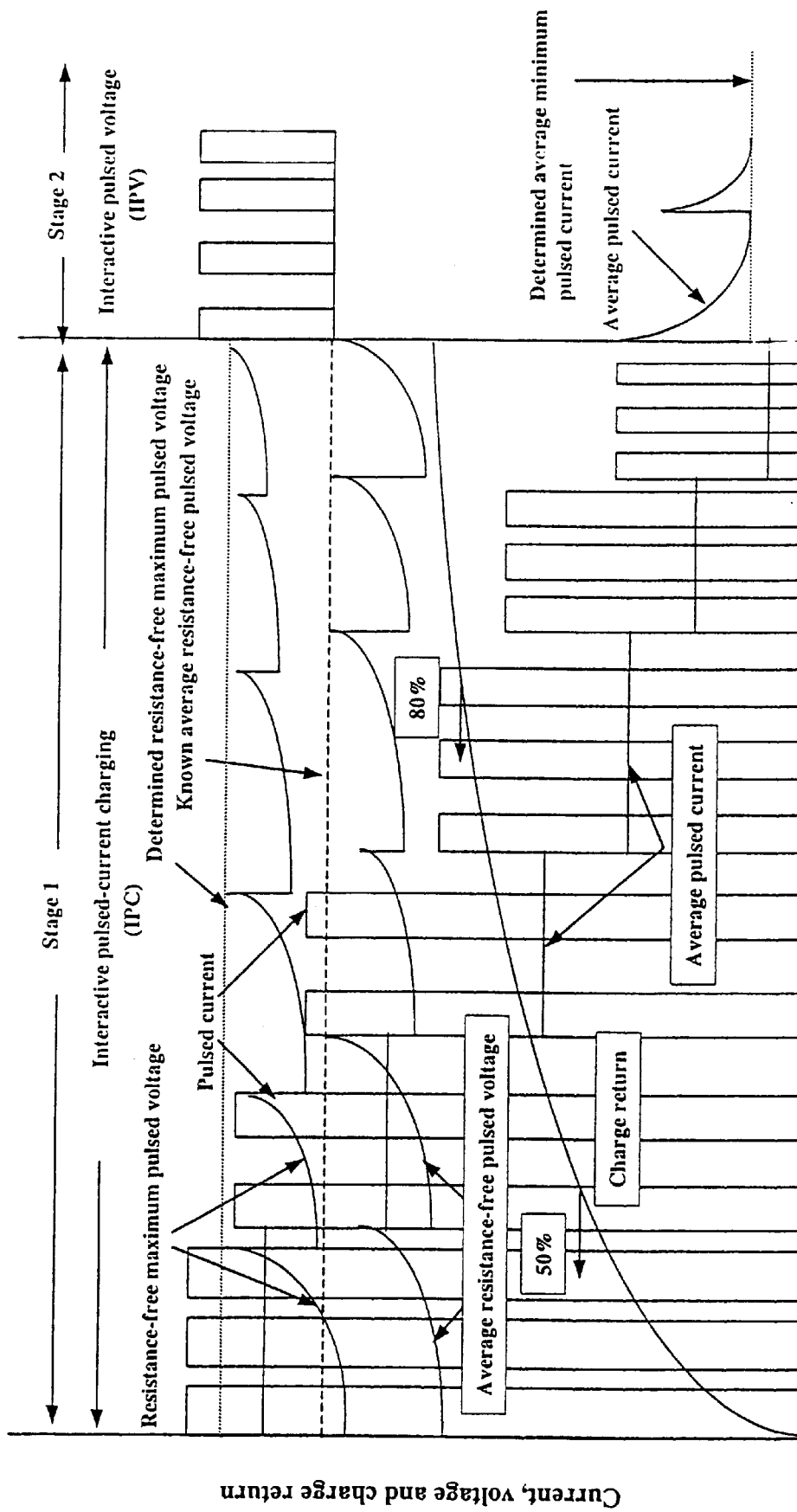
FIG. 6 is a view similar to that of FIG. 5 but showing a fifth example of the present invention.

Referring now to FIG. 6 there is shown a still further example of the invention. Here, a first stage of charging is similar to that shown in FIGS. 1 and 3 (IPC method). For the ease of simplicity, the charging as shown in FIG. 3 has been utilised for the first stage of charging. The second stage of charging differs from that in the examples shown in FIGS. 4 and 5 (ie IPC methods) in that in this example, the second stage of charging utilises a repeatedly pulsed interactive charging voltage to maintain the average charging current above the level where the time taken in the first stage to provide further appreciable charge is unacceptable (ie an IPV method). The charging is therefore an IPC-IPV method. This repeatedly pulsed charging voltage is therefore of a sufficient magnitude to maintain the average charging current above the low level and is achieved by one of the following three processes.

1. By increasing the ON-time of the pulses of the pulsed charging voltage.
2. By decreasing the OFF-time of the pulses of the pulsed charging voltage.
3. By a combination of the processes 1 and 2 above.

The pulsed voltage which is applied in the second stage is typically 2.45 volts to 2.65 volts. The pulsed current amplitude in this stage is not easily determinable.

During this process the repeatedly pulsed charging voltage causes controlled gassing sufficient to establish balance between the cells in the battery in a similar manner to that explained in the embodiments of FIGS. 4 and 5.

Figure 7:
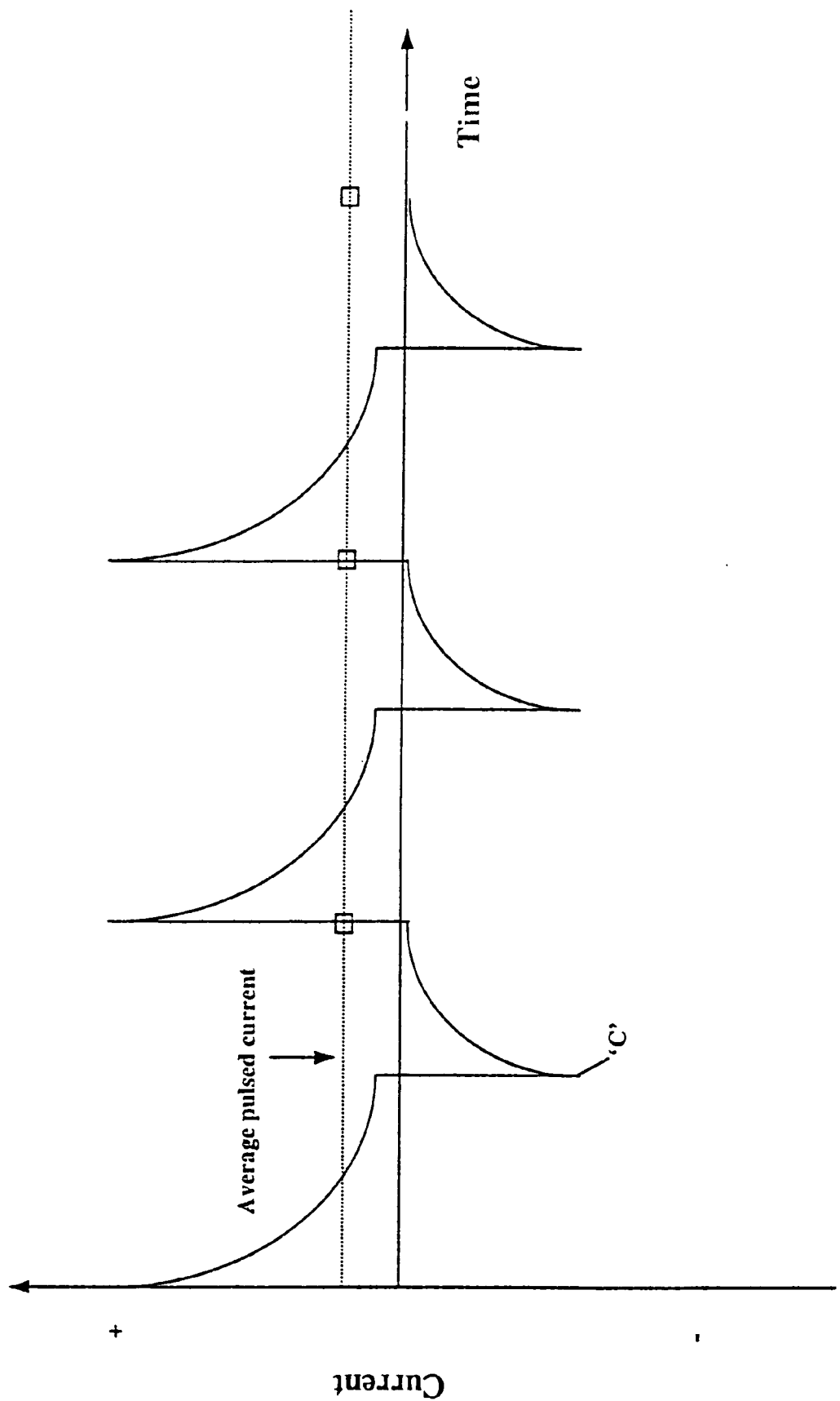
FIG. 7 is a schematic diagram of current against time showing the charging and discharging of the fifth example during the second stage of charging.

FIG. 7 shows the current during the application of the pulsed voltages in the example of FIG. 6. Here, it can be seen that the current rises rapidly to a peak during the commencement of the ON pulses of each pulse and then falls towards zero current. When the tail end of the ON pulse of the pulsed voltage is reached during each pulse, the battery is momentarily discharged as shown by the negative current spike shown by character "C". The current gradually returns towards zero amps until the application of the next pulse. Thus, at the commencement of the ON-time of that voltage the current again rises sharply as shown. The processes continues throughout all pulses. The average pulsed charging current magnitude is therefore maintained above the level where the time taken in the first stage to provide further appreciable charge is unacceptable. Because the voltages are greater than that in the first stage, enhanced charging is realised. Further, the discharge which occurs during each pulse is beneficial because it promotes release of gas from the electrodes which, in turn, is beneficial during the next pulse of charging. This provides maximum contact between the electrodes and the electrolyte at the start of the subsequent charging pulse. Thus, it can be seen that current is momentarily drawn from the battery at the end of each of the ON pulses of the repeatedly pulsed charging voltage. This current is momentarily drawn from the battery before commencement of the next ON pulse. In FIG. 6, in order for the pulsed voltage to follow an approximate square wave, it is necessary to apply the momentary discharge during each of the pulses as explained in FIG. 7.

We have recognised by maintaining the wave forms of current and voltage as square wave forms both in the first stage of charging and the second stage of charging one can then accurately measure the internal resistance of the battery during the charging process and closely control the whole charging process according to the algorithms set out above. In other words, during the IPC methods of the first stage of charging the current is maintained as a square wave. In the IPV second stage of charging the voltage is maintained as a square wave.

Since batteries are charged by any of the above examples using high pulsed current, short ON-times, gassing and heating of the batteries are minimised. Furthermore, the crystal sizes of the lead dioxide which can form at the positive and negative electrodes are reduced and thus, the service life of the batteries can be enhanced.

In all examples of charging shown above, charging should be terminated after a predetermined period. This, can conveniently be say 1 hour.

In order to provide the required charging, apparatus is provided which has a discharging/charging function and includes a central personal computer. The apparatus performs both charging and discharging of batteries. The following description is in relation to discharging. It should be understood that the charging process occurs by similar controls from the apparatus as that for discharging. Under software control; the apparatus is capable of performing a wide variety of tasks that range from short-pulse to extended-period profiles. The software control allows constant/pulsed current, constant/pulsed voltage, or power charging and discharging. Each charge or discharge step can be either switched to other charge-discharge conditions or terminated by: (I) time; (II) current or voltage; (III) overcharge factor; (IV) temperature or pressure; (V) internal resistance; (VI) power. It is also possible to combine logically all these conditions.

Figure 8:
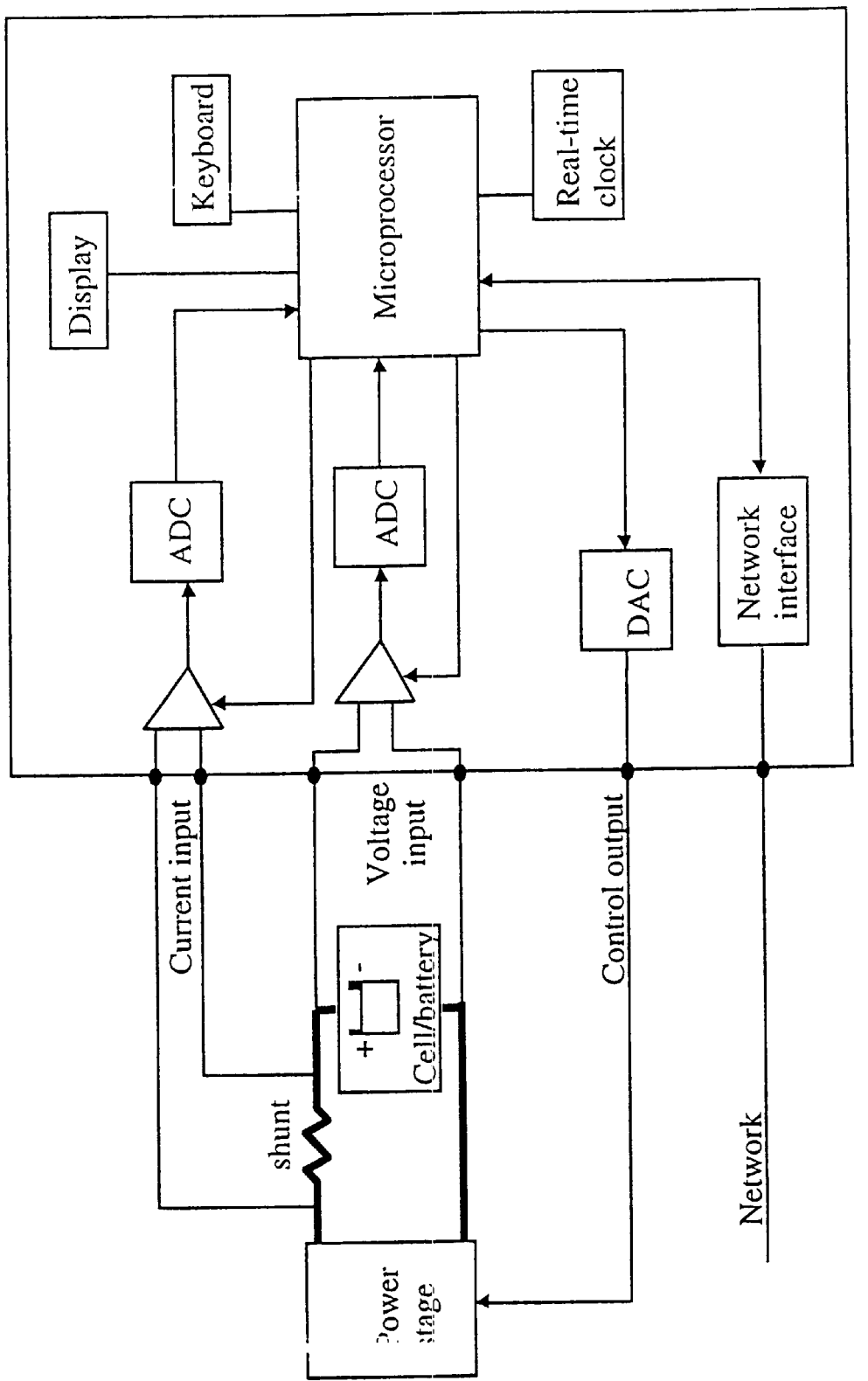
FIG. 8 is a block circuit diagram of apparatus which is used for charging and discharging batteries.

A block diagram of the apparatus including the unit is given in FIG. 8. Charging-discharging of a cell/battery is carried out by the power stage, in accordance with a set of control and measurement parameters that comprise the required duty profile (e.g., SFUDS (Simplified Federal Urban Driving Schedule or DST (Dynamic Stress Test)). The profile is programmed from a host computer, via the network interface (standard Ethernet). The controller: (I) monitors both the current flow (by means of a current shunt) and the terminal voltage of the cell/battery; (II) calculates the power; (III) compares the value from (II) with that required by the profile; (IV) adjusts the current and/or the voltage via the controller output. By adding more analogue/digital converters (ADC), the controller can also monitor both the temperature and the internal pressure of the battery.

The controller only has direct control over the current flow from the power stage. Therefore, voltage and power are set indirectly by the feedback control of the current. Successful operation of the feedback system requires the controller to operate at reasonably high speeds. The controller, in this example, makes any necessary adjustments to the current every 4 ms. Other time periods are possible and it should be understood that the shorter the time period, the greater the likelihood of reducing the charging time. The controller also functions as a data logger and records a set of measurements at intervals in the range 4 ms to several hours. These measurements are transmitted back to the host computer. The speed of the operation allows accurate recording of instantaneous voltage, current, power and energy which, in turn, ensures that the load profile is followed accurately. The control system also terminates the cycling when one of the end-of-cycle criteria is met (e.g., the battery voltage drops below a pre-determined value). The battery is then charged and the testing continues. As it is equipped with an internal real-time clock, a display and a keyboard, the controller can also function as a stand-alone charge unit that is able to store a range of simple profiles in the microprocessor.

It is important to note here that the controller unit is capable of controlling the instantaneous power rather than the average power during SFUDS or DST cycling.

The test profiles commonly used to evaluate batteries under EV duty are either the Simplified Federal Urban Driving Schedule (SFUDS) or the dynamic stress test (DST). These profiles simulate the city driving conditions of EVs. Since EV performance is determined primarily by the power available from the batteries, the batteries under this test are discharged/charged with constant-power steps, and not with constant current as is commonly employed in conventional testing procedures.

Figure 9:
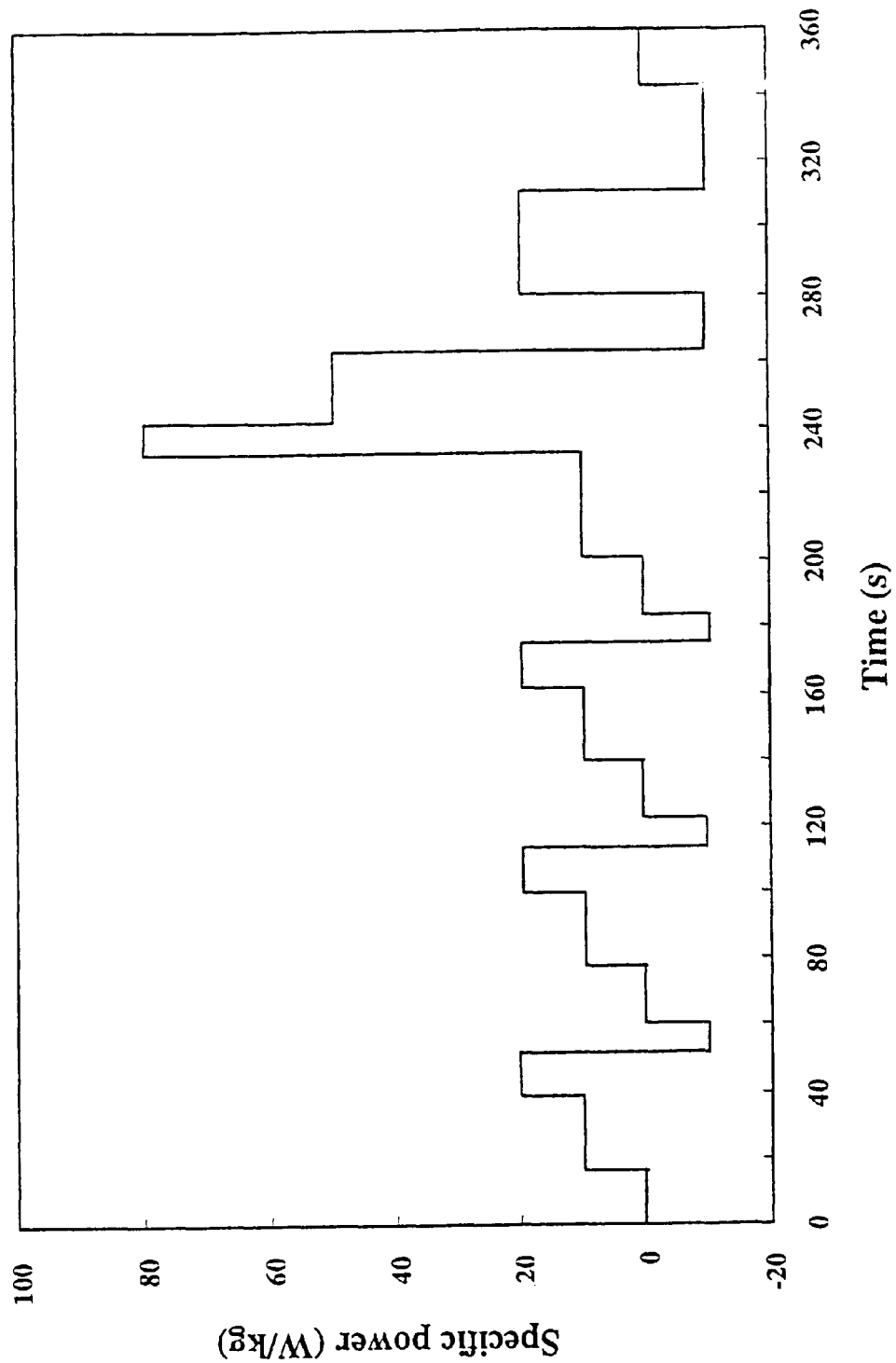
FIG. 9 is a graph of a SFUDS profile.

The SFUDS profile is given in FIG. 9. The duration of the profile is short, namely, 6 min. The profile is composed of several constant-power steps that change rapidly with time. The critical step is an 8-s period over which the battery must deliver a power of 79 W $kg^{-1}$. During this step, the battery will be discharged at relatively high current if the battery has a large weight and small unit voltage. For example, a heavy 2-V unit would be discharged at a higher current than a light 12-V battery. Each profile includes a total charge of 0.2 Wh $kg^{-1}$, which simulates a contribution from regenerative braking. Consequently, each battery subjected to this test will undergo a net discharge of about 1 Wh kg−1 during one application of the SFUDS profile. The average discharge current during one profile is approximately equal to the $C_3/3$ rate.

According to the literature available on the implementation of the SFUDS [EHP Battery Test Working Task Force, US Department of Energy, Rep. No. DOE/ID-10146, August 1988], cells/batteries for testing are subjected to the repetitive application of this profile until one of three criteria is met:

(I) the cell/battery cannot provide 50 W $kg^{-1}$ when it is demanded during the 79 or 50 W $kg^{-1}$ portions of the profile.

(II) the cell/battery cannot deliver the power required by any other portion of the schedule;

(III)the cell/battery cannot operate above the cut-off voltage under load, e.g., 1.7 V/cell.

Figure 10:
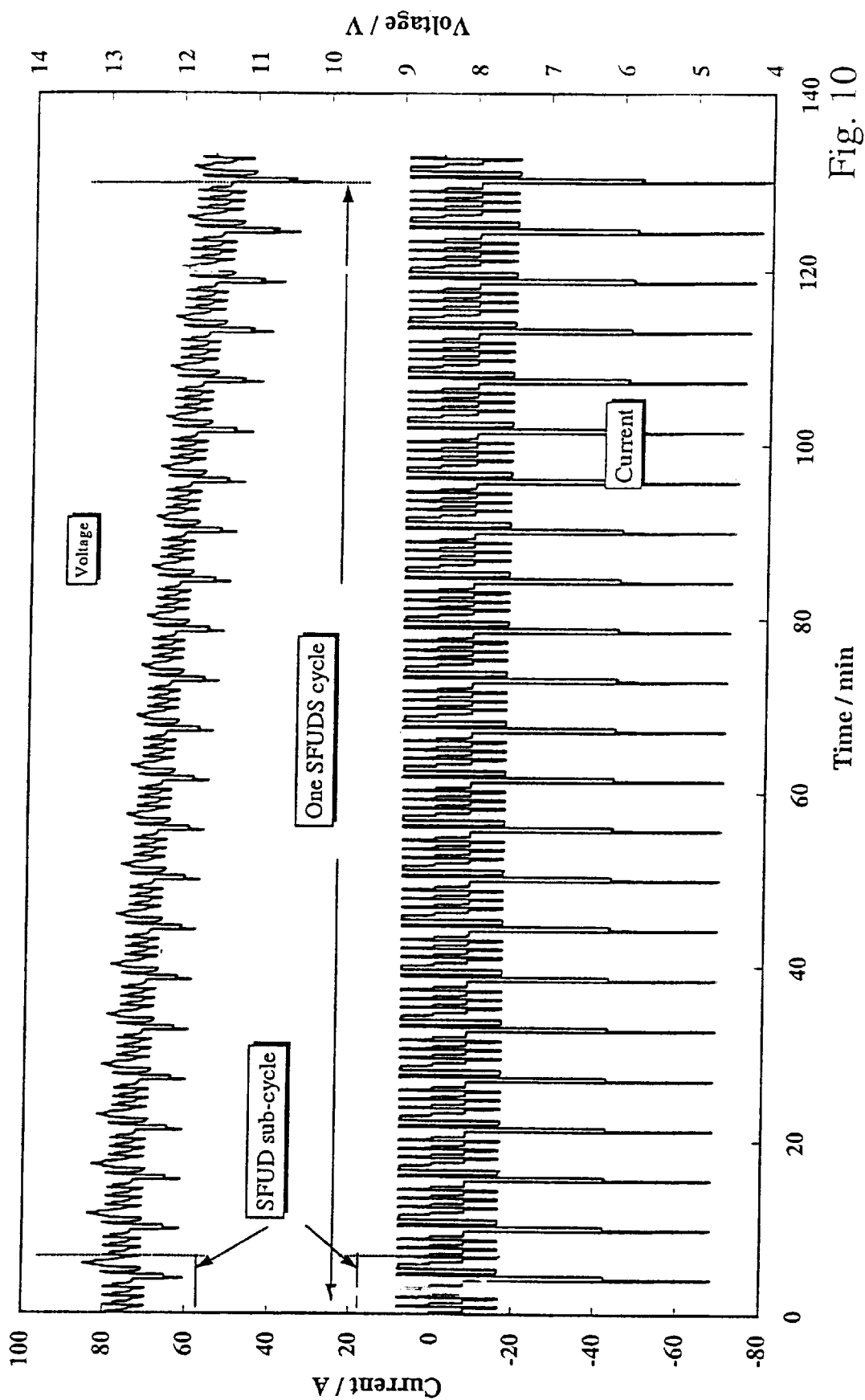
FIG. 10 is a graph of change in voltage and current during one SFUDS cycle.

FIG. 10 is an example of the voltage/current response of a battery during repetitive application of the SFUDS profile. Both voltage and current vary sharply during the peak load of each profile; the discharge current increases to its highest value while the voltage falls to its lowest level. These changes continue throughout the subsequent profiles until the cut-off voltage is reached. It has been found that the end-of-cycle is always determined by a decrease in battery voltage to the cut-off value.

To avoid confusion, each 6-min profile is defined as a "SFUDS sub-cycle" and the total discharge of the battery to the cut-off voltage as a "SFUDS cycle". It is clear that one complete SFUDS cycle will contain N sub-cycles. Battery performance is quoted in terms of SFUDS cycles.

Two methods can be used to implement the SFUDS testing. One is performed with a power profile and the other with a current profile. With the latter procedure, the average battery voltage during a SFUDS cycle is determined, and then each power step in the SFUDS profile is met by setting the required current level. This method is not appropriate, however, for the following reasons.

The average voltage during one SFUDS cycle cannot be determined precisely unless the battery is subject to the "true" power levels of SFUDS. Furthermore, the value of the average battery voltage changes with the state-of-health of the battery.

The current profile of each SFUDS sub-cycle would be the same for all sub-cycles in all SFUDS cycles. This does not truly simulate the driving conditions of an EV. For example, the current demanded from the battery to provide the required power will increase with increasing depth-of-discharge of the battery. This situation can be observed from the data in FIG. 10, i.e., when the battery voltage during the period of the peak load approaches the cut-off value, the corresponding discharge current increases sharply.

Therefore, charge-discharge equipment should be designed in such a way that the unit can control the power demands. As seen from the SFUDS profile, the magnitude of the load reaches relatively high values and each step changes rapidly with time. Therefore, in order to perform SFUDS testing, the equipment must have a rapid monitoring and feedback capability to ensure that the product of voltage and current, matches with the power required.

The following experimental procedure was used for cells/batteries that were evaluated under SFUDS profile:

(I) stabilize the capacity of the cells/batteries at the $C_3/3$ rate;

(II) subject the cells/batteries to repetitive SFUDS sub-cycles at room temperature (approximately 20° C.) until the cell/battery voltage reaches the cut-off value as recommended by the manufacturer; record the total capacity and energy;

(III) allow the cells/batteries to stand at open circuit until the cell/battery temperature falls to 35° C.;

(IV) recharge the cell/battery with uninterrupted current or pulsed current to the overcharge factor recommended by the manufacturer;

(V) allow the temperature of the cell/battery to fall to 35° C.;

(VI) repeat steps (II) to (V) until the specific capacity and/or the specific energy of the cell/battery falls to 80% of the initial value; the initial value of the specific capacity or specific energy is taken as the average for the first three SFUDS cycles and is termed the "useful specific capacity" or "useful specific-energy".

Figure 11:
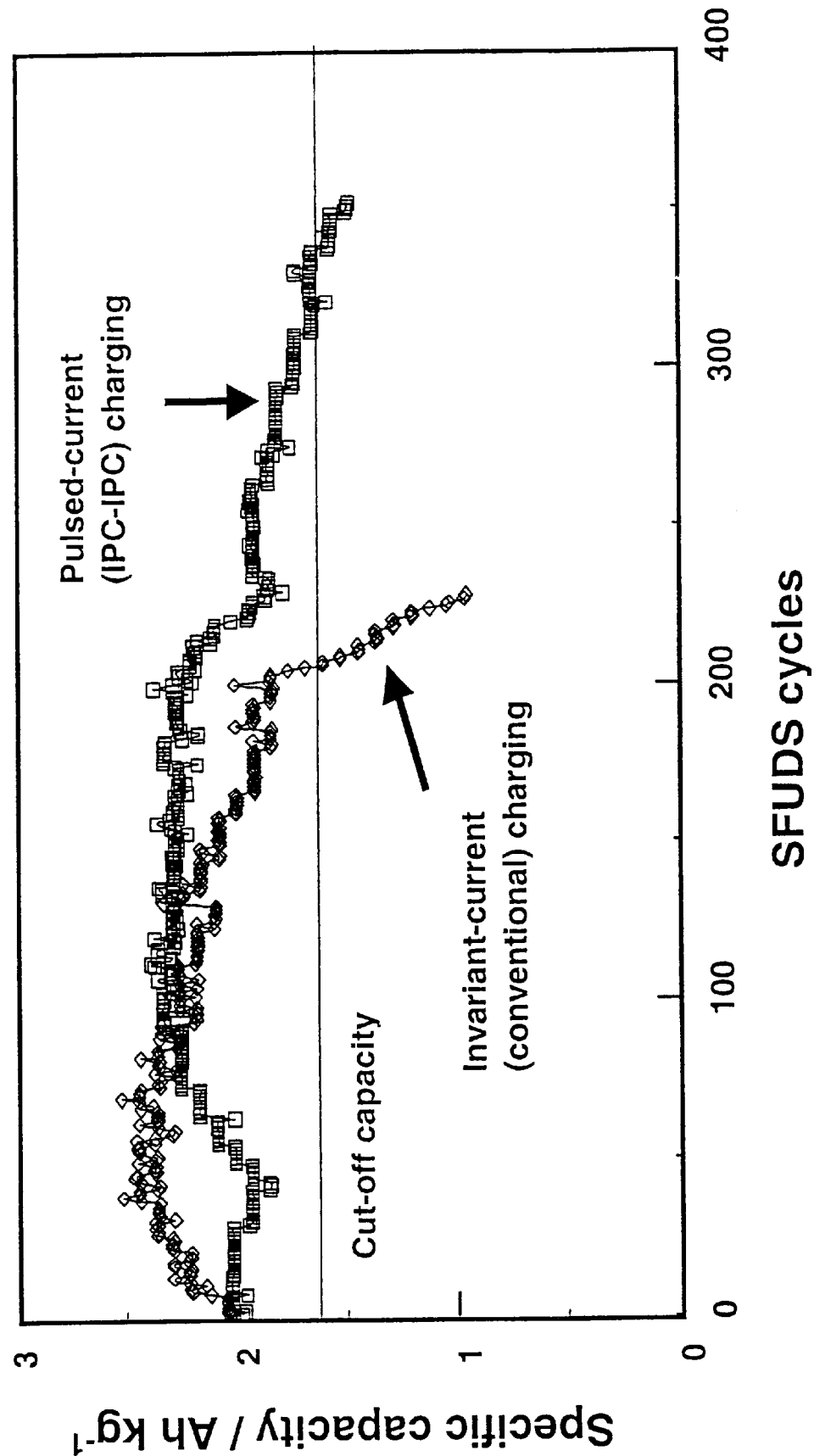
FIG. 11 is a graph of SFUDS cycling performance of VRLA batteries recharged with either conventional or pulsed-current procedures.

An example of the service life of commercial valve-regulated lead acid (VRLA) batteries using absorbent glass-mat (12 V, $C_3$=52 Ah) under simulated electric vehicle driving profile (simplified federal urban driving schedule, SFUDS) is given in FIG. 11. One battery is recharged with the pulsed-current technique (IPC-IPC method) described herein and the other with a conventional charging technique. One SFUDS cycle is equivalent to the driving range per one recharge of the vehicle. A battery is regarded as "failed" when its capacity reaches 80% of its useful capacity (the average value for the first three capacities). The results show clearly that the battery recharged with the IPC-IPC method described herein gives significantly longer life than the battery charged with the conventional charging technique (i.e., 320 SFUDS cycles vs. 200 SFUDS cycles). Furthermore, with the conventional charging technique the time required to fully charge the battery is about 16 h. With the pulsed-current technique described herein, the time required to fully charge the battery is significantly shortened.

Figure 12:
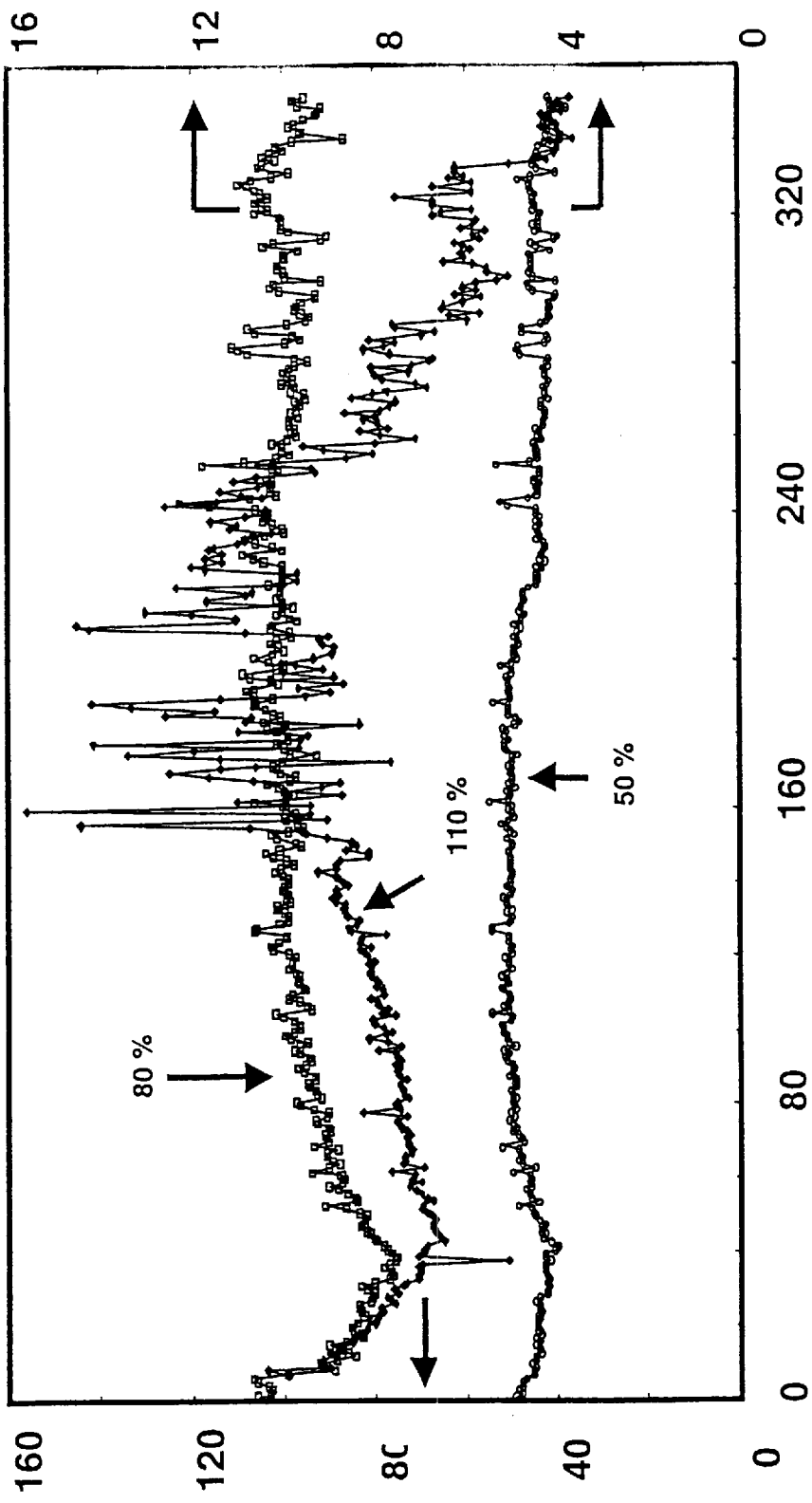
FIG. 12 is a graph showing time taken to return to a specified charge of a battery undergoing SFUDS cycles and, FIG. 13 is a graph showing the effect of pulsed charging in accordance with the examples of the present invention on battery life in relation to SFUDS cycles.

FIG. 12 shows the time taken to return 50, 80 and 110% of the charge provided during the previous charging cycle to the above VRLA battery when recharging with IPC-IPC method. It can be seen that the time taken to return 50 and 80% to the battery is within 5 and 11 min, respectively. For 110% charge return, the time varies from 60 to 160 min, but the majority of the data falls within 100 min.

Figure 13:
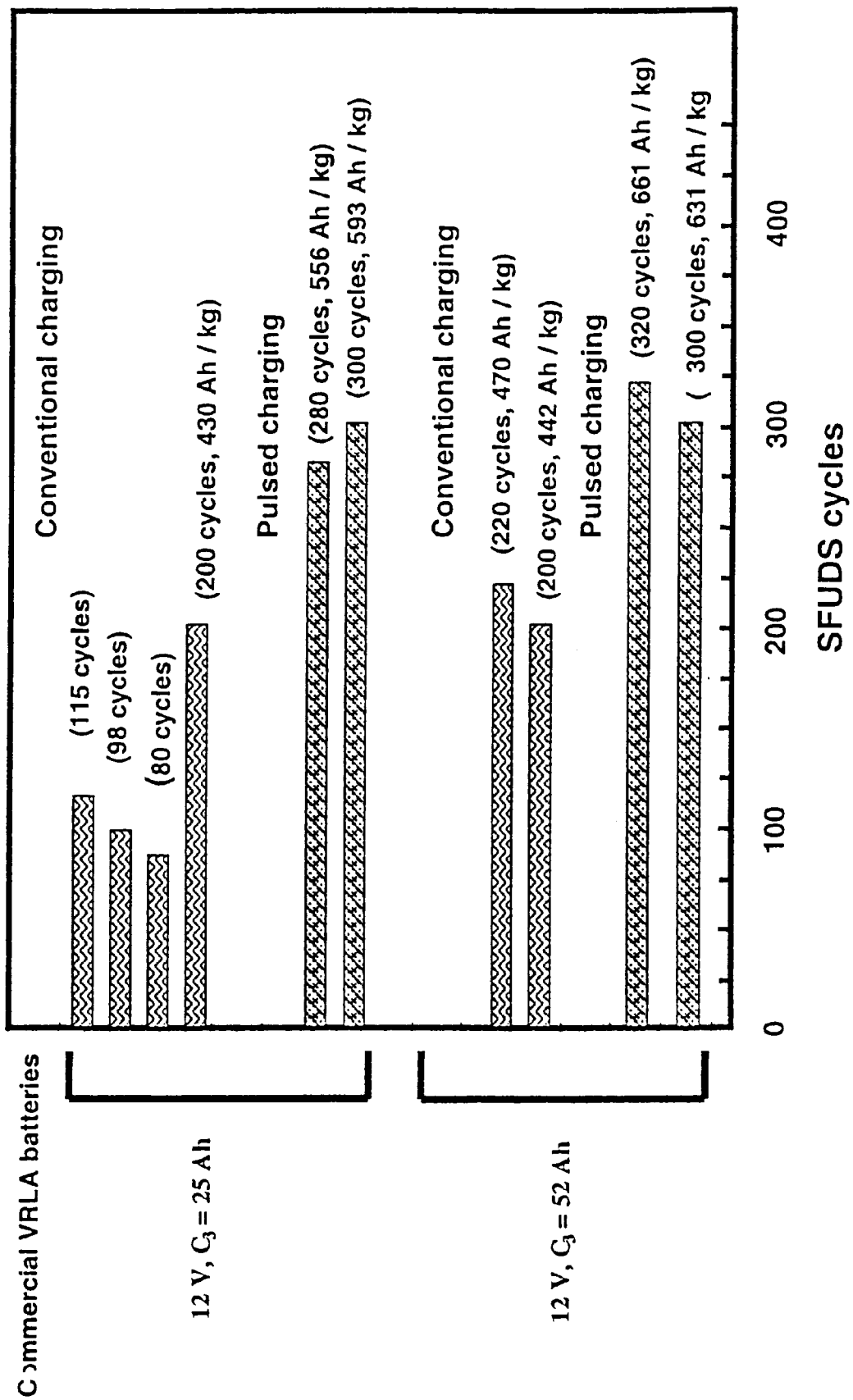

The consistency of the pulsed-current technique has also been verified not only on the same battery type but also on another battery type. The overall performance of batteries when subjected to this pulsed-current technique is given in FIG. 13. It can be seen that this pulsed technique enhances the life of batteries irrespective of the battery type.

Alternative applications of the above methods are possible without departing from the scope of the present invention.

What is claimed is:

1. A method for charging a battery comprising:

determining a resistance free maximum pulsed voltage as the battery is being charged above that of a known average resistance free pulsed voltage for the battery type, said determined resistance free maximum pulsed voltage being below that at which unacceptable gassing will occur, providing a repeatedly pulsed charging current to the battery sufficient to cause the determined resistance free maximum pulsed voltage to be reached over time, monitoring the resistance free maximum pulsed voltage to detect when the resistance free maximum pulsed voltage reaches the determined resistance free maximum pulsed voltage, continuing charging with the repeatedly pulsed charging current to maintain the resistance free maximum pulsed voltage at approximately the determined resistance free maximum pulsed voltage by at least one of:

(I) reducing the amplitude of the pulsed charging current, (II) increasing the OFF-time of pulses of the pulsed charging current, and (III) decreasing the ON-time of pulses of the pulsed charging current.

2. A method as claimed in claim 1 and further comprising:

determining the known average resistance free pulsed voltage for the battery type, monitoring the average resistance free pulsed voltage to detect when the average resistance free pulsed voltage reaches the determined known average resistance free pulsed voltage, continuing charging with the repeatedly pulsed charging current to maintain the average resistance free pulsed voltage at approximately the determined known average resistance free pulsed voltage by at least one of:
  (I) reducing the amplitude of the pulsed charging current
  (II) increasing the OFF-time of pulses of the Pulsed charging current, and
  (III) decreasing the ON-time of pulses of the pulsed charging current.

3. A method as claimed in claim 1 further comprising terminating the repeatedly pulsed charging current when the average pulsed charging current falls to a predetermined level where the time taken to provide further appreciable charge is unacceptable and then charging at a second stage of charging by applying a repeatedly pulsed second stage charging current of a larger amplitude than in the first stage and of a shorter ON-time than the pulsed charging current ON-time in the first stage of charging,
  said second stage comprising:
    determining a new average resistance free pulsed voltage above that in the first stage, said new average resistance free pulsed voltage resulting in controlled gassing sufficient to establish balance between cells in the battery,
    monitoring the average resistance free pulsed voltage to detect when the average resistance free pulsed voltage reaches the determined new average resistance free pulsed voltage,
    continuing charging with the repeatedly pulsed second stage charging current to maintain the average resistance free pulsed voltage at approximately the determined new average resistance free pulsed voltage by at least one of:
      (I) reducing the amplitude of the pulsed charging current
      (II) increasing the OFF-time of pulses of the pulsed charging current, and
      (III) decreasing the ON-time of pulses of the pulsed charging current.

4. A method as claimed in claim 2, further comprising terminating the repeatedly pulsed charging current when the average pulsed charging current falls to a predetermined level where the time taken to provide further appreciable charge is unacceptable and then charging at a second stage of charging by applying a repeatedly pulsed second stage charging current of a larger amplitude than in the first stage and of a shorter ON-time than the pulsed charging current ON-time in the first stage of charging:
  determining a new resistance free maximum pulsed voltage above that in the first stage, said new resistance free maximum pulsed voltage resulting in controlled gassing sufficient to establish balance between cells in the battery,
  monitoring the resistance free maximum pulsed voltage to detect when the resistance free maximum pulsed voltage reaches the determined new resistance free maximum pulsed voltage,
  continuing charging with the repeatedly pulsed second stage charging current to maintain the resistance free maximum pulsed voltage at approximately the determined new resistance free maximum pulsed voltage by at least one of:
    (I) reducing the amplitude of the pulsed charging current
    (II) increasing the OFF-time of pulses of the pulsed charging current, and
    (III) decreasing the ON-time of pulses of the pulsed charging current.

5. A method as claimed in claim 2 further comprising:
  terminating the repeatedly pulsed charging current when the average pulsed charging current falls to a level where the time taken to provide further appreciable charge is unacceptable and then
  charging at a second stage of charging by applying a repeatedly pulsed charging voltage to maintain the average pulsed charging current above the level where the time taken to provide further appreciable charge is unacceptable by at least one of:
    I) increasing the ON-time of pulses of the repeatedly pulsed charging voltage, and
    II) decreasing the OFF-time of pulses of the repeatedly pulsed charging voltage,
  said repeatedly pulsed charging voltage in said second stage resulting in controlled gassing sufficient to establish balance between cells in the battery.

6. A method as claimed in claim 5 further comprising:
  at the end of an ON pulse in the repeatedly pulsed charging voltage in the second stage, momentarily drawing current from the battery before commencement of the next ON pulse.

7. A method as claimed in claim 6 wherein the repeatedly pulsed charging current is that of a square wave.

8. A method as claimed in claim 6 wherein the repeatedly pulsed charging voltage is that of a square wave.

9. A method as claimed in claim 2 further comprising terminating the repeatedly pulsed charging current when the average pulsed charging current falls to a predetermined level where the time taken to provide further appreciable charge is unacceptable and then charging at a second stage of charging by applying a repeatedly pulsed second stage charging current of a larger amplitude than in the first stage and of a shorter ON-time than the pulsed charging current ON-time in the first stage of charging,
  said second stage comprising:
    determining a new average resistance free pulsed voltage above that in the first stage, said new average resistance free pulsed voltage resulting in controlled gassing sufficient to establish balance between cells in the battery,
    monitoring the average resistance free pulsed voltage to detect when the average resistance free pulsed voltage reaches the determined new average resistance free pulsed voltage,
    continuing charging with the repeatedly pulsed second stage charging current to maintain the average resistance free pulsed voltage at approximately the determined new average resistance free pulsed voltage by at least one of:
      (I) reducing the amplitude of the pulsed charging current
      (II) increasing the OFF-time of pulses of the pulsed charging current, and
      (III) decreasing the ON-time of pulses of the pulsed charging current.

10. A method as claimed in claim 9, further comprising terminating the repeatedly pulsed charging current when the average pulsed charging current falls to a predetermined level where the time taken to provide further appreciable charge is unacceptable and then charging at a second stage of charging by applying a repeatedly pulsed second stage charging current of a larger amplitude than in the first stage and of a shorter ON-time than the pulsed charging current ON-time in the first stage of charging:

determining a new resistance free maximum pulsed voltage above that in the first stage, said new resistance free maximum pulsed voltage resulting in controlled gassing sufficient to establish balance between cells in the battery, monitoring the resistance free maximum pulsed voltage to detect when the resistance free maximum pulsed voltage reaches the determined new resistance free maximum pulsed voltage, continuing charging with the repeatedly pulsed second stage charging current to maintain the resistance free maximum pulsed voltage at approximately the determined new resistance free maximum pulsed voltage by at least one of (I) reducing the amplitude of the pulsed charging current (II) increasing the OFF-time of pulses of the pulsed charging current, and (III) decreasing the ON-time of pulses of the pulsed charging current.

11. A method as claimed in claim 1, further comprising terminating the repeatedly pulsed charging current when the average pulsed charging current falls to a predetermined level where the time taken to provide further appreciable charge is unacceptable and then charging at a second stage of charging by applying a repeatedly pulsed second stage charging current of a larger amplitude than in the first stage and of a shorter ON-time than the pulsed charging current ON-time in the first stage of charging:

determining a new resistance free maximum pulsed voltage above that in the first stage, said new resistance free maximum pulsed voltage resulting in controlled gassing sufficient to establish balance between cells in the battery, monitoring the resistance free maximum pulsed voltage to detect when the resistance free maximum pulsed voltage reaches the determined new resistance free maximum pulsed voltage, continuing charging with the repeatedly pulsed second stage charging current to maintain the resistance free maximum pulsed voltage at approximately the determined new resistance free maximum pulsed voltage by at least one of:

(I) reducing the amplitude of the pulsed charging current (II) increasing the OFF-time of pulses of the pulsed charging current, and (III) decreasing the ON-time of pulses of the pulsed charging current.

12. A method as claimed in claim 1 further comprising:

terminating the repeatedly pulsed charging current when the average pulsed charging current falls to a level where the time taken to provide further appreciable charge is unacceptable and then charging at a second stage of charging by applying a repeatedly pulsed charging voltage to maintain the average pulsed charging current above the level where the time taken to provide further appreciable charge is unacceptable by at least one of:

I) increasing the ON-time of pulses of the repeatedly pulsed charging voltage, and II) decreasing the OFF-time of pulses of the repeatedly pulsed charging voltage, said repeatedly pulsed charging voltage in said second stage resulting in controlled gassing sufficient to establish balance between cells in the battery.

13. A method as claimed in claim 12 further comprising:

at the end of an ON pulse in the repeatedly pulsed charging voltage in the second stage, momentarily drawing current from the battery before commencement of the next ON pulse.

14. A method as claimed in claim 13 wherein the repeatedly pulsed charging current is that of a square wave.

15. A method as claimed in claim 13 wherein the repeatedly pulsed charging voltage is that of a square wave.

16. Apparatus for charging a battery comprising:

a repeatedly pulsed current providing means for providing a determined resistance free maximum pulsed voltage to the battery that is determined as the battery is being charged and that is above that of a known average resistance free pulsed voltage for the battery type, said resistance free maximum pulsed voltage being below that at which unacceptable gassing will occur, monitoring means for monitoring the resistance free pulsed voltage to detect when the resistance free pulsed voltage reaches the determined resistance free maximum pulsed voltage, controlling means connected with the monitoring means for controlling the repeatedly pulsed charging current following the determined maximum pulsed voltage being reached to approximately maintain the resistance free maximum pulsed voltage at the determined resistance free maximum pulsed voltage by at least one of:

(I) reducing the amplitude of the pulsed charging current, (II) increasing the OFF-time of pulses of the pulsed charging current, and (III) decreasing the ON-time of pulses of the pulsed charging current.

17. Apparatus as claimed in claim 16 wherein said monitoring means is also for monitoring the average resistance free pulsed voltage to detect when the average resistance free pulsed voltage reaches a known average resistance free pulsed voltage for the battery type, and wherein said controlling means is also for controlling the repeatedly pulsed charging current following the known average resistance free pulsed voltage being reached, to approximately maintain the average resistance free pulsed voltage at the known average resistance free pulsed voltage by at least one of:

(I) reducing the amplitude of the pulsed charging current, (II) increasing the OFF-time of pulses of the pulsed charging current, and (III) decreasing the ON-time of pulses of the pulsed charging current.

18. Apparatus as claimed in claim 17 including average pulsed charging current monitoring means for monitoring the average pulsed charging current in a first stage of charging to detect when the average pulsed charging current falls to a level where the time taken to provide further appreciable charge is unacceptable and for then charging at a second stage of charging by causing the controlling means to then provide a new repeatedly pulsed charging current of a shorter ON-time than the repeatedly pulsed charging current ON-time in the first stage, said repeatedly pulsed current providing means then providing a new average resistance free pulsed voltage above that in the first stage which will result in controlled gassing to establish balance between cells in the battery, said monitoring means then monitoring the average resistance free pulsed voltage to detect when the average resistance free pulsed voltage reaches the new average resistance free pulsed voltage, said controlling means then controlling the new repeatedly pulsed charging current to approximately maintain the average resistance free pulsed voltage at the new average resistance free pulsed voltage by at least one of
(I) reducing the amplitude of the pulsed charging current,
(II) increasing the OFF-time of pulses of the pulsed charging current, and
(III) decreasing the ON-time of pulses of the pulsed charging current.

19. Apparatus as claimed in claim 18 including processing means interconnected with said repeatedly pulsed current providing means, said monitoring means and said controlling means, said processing means being under control of a program for charging operation.

20. Apparatus as claimed in claim 17 including average pulsed charging current monitoring means for monitoring the average pulsed charging current in a first stage of charging to detect when the average pulsed charging current falls to a level where the time taken to provide further appreciable charge is unacceptable and for then charging at a second stage of charging by causing the controlling means to then provide a new repeatedly pulsed charging current of a shorter ON-time than the repeatedly pulsed charging current ON-time in the first stage, said repeatedly pulsed current providing means then providing a new resistance free maximum pulsed voltage above that in the first stage which will result in controlled gassing to establish balance between cells in the battery, said monitoring means then monitoring the resistance free maximum pulsed voltage to detect when the resistance free maximum pulsed voltage reaches the new resistance free maximum pulsed voltage, said controlling means then controlling the new repeatedly pulsed charging current following the new resistance free maximum pulsed voltage being reached to approximately maintain the resistance free maximum pulsed voltage at the new resistance free maximum pulsed voltage by at least one of:
(I) reducing the amplitude of the pulsed charging current,
(II) increasing the OFF-time of pulses of the pulsed charging current, and
(III) decreasing the ON-time of pulses of the pulsed charging current.

21. Apparatus as claimed in claim 17 including charging terminating means controlled by timing means to terminate charging after a predetermined time period after commencement of the second stage of charging.

22. Apparatus as claimed in claim 16 including average pulsed charging current monitoring means for monitoring the average pulsed charging current in a first stage of charging to detect when the average pulsed charging current falls to a level where the time taken to provide further appreciable charge is unacceptable and for then charging at a second stage of charging by causing the controlling means to then provide a new repeatedly pulsed charging current of a shorter ON-time than the repeatedly pulsed charging current ON-time in the first stage, said repeatedly pulsed current providing means then providing a new average resistance free pulsed voltage above that in the first stage which will result in controlled gassing to establish balance between cells in the battery, said monitoring means then monitoring the average resistance free pulsed voltage to detect when the average resistance free pulsed voltage reaches the new average resistance free pulsed voltage, said controlling means then controlling the new repeatedly pulsed charging current to approximately maintain the average resistance free pulsed voltage at the new average resistance free pulsed voltage by at least one of
(I) reducing the amplitude of the pulsed charging current,
(II) increasing the OFF-time of pulses of the 5 pulsed charging current, and
(III) decreasing the ON-time of pulses of the pulsed charging current.

23. Apparatus as claimed in claim 22 including average pulsed charging current monitoring means for monitoring the average pulsed charging current in a first stage of charging to detect when the average pulsed charging current falls to a level where the time taken to provide further appreciable charge is unacceptable and for then charging at a second stage of charging by causing the controlling means to then provide a new repeatedly pulsed charging current of a shorter ON-time than the repeatedly pulsed charging current ON-time in the first stage, said repeatedly pulsed current providing means then providing a new resistance free maximum pulsed voltage above that in the first stage which will result in controlled gassing to establish balance between cells in the battery, said monitoring means then monitoring the resistance free maximum pulsed voltage to detect when the resistance free maximum pulsed voltage reaches the new resistance free maximum pulsed voltage, said controlling means then controlling the new repeatedly pulsed charging current following the new resistance free maximum pulsed voltage being reached to approximately maintain the resistance free maximum pulsed voltage at the new resistance free maximum pulsed voltage by at least one of:
(I) reducing the amplitude of the pulsed charging current,
(II) increasing the OFF-time of pulses of the pulsed charging current, and
(III) decreasing the ON-time of pulses of the pulsed charging current.

24. Apparatus as claimed in claim 22 wherein said average pulsed charging current monitoring means monitors the average pulsed charging current to detect when the average pulsed charging current falls to a level where the time taken to provide further appreciable charge is unacceptable and for then charging in a second stage of charging to maintain the average pulsed charging current at approximately the level where the time taken to provide further appreciable charge is unacceptable by applying a repeatedly pulsed charging voltage from a voltage providing means by at least one of:
I) increasing the ON-time of the pulses of the 5 repeatedly pulsed charging voltage, and
II) decreasing the OFF-time of the pulses of the repeatedly pulsed charging voltage, said repeatedly pulsed charging voltage in said second stage resulting in controlling gassing sufficient to establish balance between cells in the battery.

25. Apparatus as claimed in claim 24 wherein said repeatedly pulsed current providing means provides a repeatedly pulsed square wave current.

26. Apparatus as claimed in claim 25 having battery internal resistance calculating means for calculating the internal resistance of the battery and for providing the calculated internal resistance to said monitoring means so the resistance free maximum pulsed voltage can be determined, using the internal resistance derived from said square wave current.

27. Apparatus as claimed in claim 25 having battery internal resistance calculating means for calculating the internal resistance of the battery and for providing the calculated internal resistance to said monitoring means so the average resistance free voltage can be determined from said square wave current.

28. Apparatus as claimed in claim 24 wherein said voltage providing means for providing repeatedly pulsed charging voltage in the second stage of charging is a square wave voltage providing means.

29. Apparatus as claimed in claim 28 having battery internal resistance calculating means for calculating the internal resistance of the battery and for providing the calculated internal resistance to said monitoring means so that the new resistance free maximum pulsed voltage in the second stage of charging can be derived from said square wave voltage.

30. Apparatus as claimed in claim 28 having battery internal resistance calculating means for calculating the internal resistance of the battery and for providing the calculated internal resistance to said monitoring means so that the new average resistance free pulsed voltage in the second stage can be determined from said square wave voltage.

31. Apparatus as claimed in claim 24 wherein current drawing means is provided for momentarily drawing current from the battery during the second stage at the end of an ON pulse and before commencement of the next ON pulse.

32. Apparatus as claimed in claim 22 including charging terminating means controlled by timing means to terminate charging after a predetermined time period after commencement of the second stage of charging.

33. Apparatus as claimed in claim 16 including average pulsed charging current monitoring means for monitoring the average pulsed charging current in a first stage of charging to detect when the average pulsed charging current falls to a level where the time taken to provide further appreciable charge is unacceptable and for then charging at a second stage of charging by causing the controlling means to then provide a new repeatedly pulsed charging current of a shorter ON-time than the repeatedly pulsed charging current ON-time in the first stage, said repeatedly pulsed current providing means then providing a new resistance free maximum pulsed voltage above that in the first stage which will result in controlled gassing to establish balance between cells in the battery, said monitoring means then monitoring the resistance free maximum pulsed voltage to detect when the resistance free maximum pulsed voltage reaches the new resistance free maximum pulsed voltage, said controlling means then controlling the new repeatedly pulsed charging current following the new resistance free maximum pulsed voltage being reached to approximately maintain the resistance free maximum pulsed voltage at the new resistance free maximum pulsed voltage by at least one of:
  (I) reducing the amplitude of the pulsed charging current,
  (II) increasing the OFF-time of pulses of the pulsed charging current, and
  (III) decreasing the ON-time of pulses of the pulsed charging current.

34. Apparatus as claimed in claim 16 including charging terminating means controlled by timing means to terminate charging after a predetermined time period after commencement of the second stage of charging.

* * * * *